US009134974B2

(12) United States Patent
Brower et al.

(10) Patent No.: US 9,134,974 B2
(45) Date of Patent: Sep. 15, 2015

(54) SOURCE CODE SEPARATION AND GENERATION FOR HETEROGENEOUS CENTRAL PROCESSING UNIT (CPU) COMPUTATIONAL DEVICES

(71) Applicant: Signalogic, Inc., Dallas, TX (US)

(72) Inventors: Jeffrey H. Brower, Dallas, TX (US); Christopher K. Johnson, Frisco, TX (US)

(73) Assignee: Signalogic, Inc., Dallas, TX (US)

( * ) Notice: Subject to any disclaimer, the term of this patent is extended or adjusted under 35 U.S.C. 154(b) by 0 days.

(21) Appl. No.: 13/998,578

(22) Filed: Nov. 12, 2013

(65) Prior Publication Data

US 2014/0149969 A1   May 29, 2014

Related U.S. Application Data

(60) Provisional application No. 61/725,125, filed on Nov. 12, 2012.

(51) Int. Cl.
*G06F 9/44* (2006.01)
*G06F 9/45* (2006.01)

(52) U.S. Cl.
CPC .... *G06F 8/41* (2013.01); *G06F 8/423* (2013.01); *G06F 8/45* (2013.01)

(58) Field of Classification Search
CPC ...................................... G06F 8/41; G06F 8/76

USPC ........................................................ 717/140
See application file for complete search history.

(56) References Cited

U.S. PATENT DOCUMENTS

| 5,598,560 | A  | * | 1/1997 | Benson ........................ 717/159 |
|---|---|---|---|---|
| 6,345,311 | B1 | * | 2/2002 | Breslau et al. ................ 719/310 |
| 7,917,900 | B2 | * | 3/2011 | Rajamani et al. ............. 717/152 |
| 8,296,743 | B2 | * | 10/2012 | Linderman et al. .......... 717/140 |
| 2006/0112377 | A1 | * | 5/2006 | Nacul et al. ................... 717/140 |
| 2008/0178163 | A1 | * | 7/2008 | Gschwind et al. ............ 717/140 |
| 2010/0205580 | A1 | * | 8/2010 | McAllister et al. ........... 717/106 |
| 2011/0314458 | A1 | * | 12/2011 | Zhu et al. ...................... 717/149 |

* cited by examiner

*Primary Examiner* — Ryan Coyer
(74) *Attorney, Agent, or Firm* — Haynes and Boone, LLP

(57) ABSTRACT

An example method includes obtaining annotated source code and based at least in part on a first annotation, separating the source code into first and second source code portions. The method also includes generating from the first source code portion a first source code stream to be supplied for compilation by a first compiler, the first source code stream augmented, based on the first annotation, to include additional coordination code not present in the obtained source code, and the first compiler specific to the first-type subset of the target CPUs. The method further includes generating from the second source code portion a second source code stream to be supplied for compilation by a second compiler, the second compiler specific to a second-type subset of the target CPUs. The target CPUs of the first- and second-type subsets have one or more different functionalities.

24 Claims, 13 Drawing Sheets

106

```
short int x[X_LEN], h[H_LEN], y[X_LEN+H_LEN-1];        // Line 1
short int a[M][N], b[N][P], c[M][P];

int main() {
                                                        // Line 5
  int i, j, k = 0, sum, h_len = H_LEN, x_len = X_LEN, conv_len = h_len + x_len - 1;

#pragma cim parallel sections {
    #pragma cim parallel section { /* convolution */
      #pragma cim parallel for num_threads 2            // Line 10 for (i = 0; i < conv_len; i++) {
        sum = 0;
        for (j = 0; j < h_len; j++) sum += h[j] * x[i + j];
        y[i] = sum >> 15;                               // Line 15
      }
    } pragma cim parallel section { /* matrix multiply */
      #pragma cim parallel for num_threads 2            // Line 20
      for (i=0; i<M; i++) {
        for (j=0; j<P; j++) {
          for (k=0; k<N; k++) c[i][j] += b[i][k] * a[k][j];
        }
      }                                                 // Line 25
    }
}
```

```
#ifdef _SIGC667X
#include "hwlib.h"
#include "cimlib.h"

HBOARD hBoard_gbl;
endif short int x[196000UL], h[36000UL], y[231999UL];

short int a[100UL][200UL], b[200UL][300UL], c[100UL][300UL];

int main()
/* CIM_RGN local 1
CIM_VAR, inout, x, short x[196000UL];
CIM_VAR, inout, h, short h[36000UL];
CIM_VAR, inout, y, short y[231999UL];
:
:
CIM_VAR, inout, conv_len, int conv_len =((h_len + x_len) - 1);
CIM_RGN end
*/
{
  int h_len = 36000, x_len = 196000, conv_len = ((h_len + x_len) - 1);
/* CIM_INIT */
#ifdef _SIGC667X
short int nCores = 8;
short int nCoreList1 = 7;
short int nCoreList2 = 24;
```

```
HBOARD hBoard = DSAssignBoard(NULL, "SIGC64XX", 0, 0, 0, FALSE, nCores);
hBoard_gbl = hBoard;
DSLoadFileCore(hBoard, "convolution.out", nCoreList1);     ── 402
DSLoadFileCore(hBoard, "matmultiply.out", nCoreList2);     ── 404
unsigned int dwAddr_x = DSGetSymbolAddre(hBoard, NULL, "_x");
unsigned int dwAddr_h = DSGetSymbolAddre(hBoard, NULL, "_h");
:
Unsigned int dwAddre_RunFlag = DSGetSymbolAddr(hBoard, NULL, "_RunFlag");
{
/* CIM_RGN par 1
CIM_VAR, in, x, short x[196000UL];
CIM_VAR, in, h, short h[36000UL];
CIM_VAR, out, y, short y[231999UL];

CIM_VAR, in, conv_len, int conv_len =((h_len + x_len) - 1);
CIM_NUM_CORES 3
*/
#ifdef _SIGC667X
m = sizeof(x)/sizeof(int);
DSSetMemEx(hBoard, DS_GM_LINEAR_DATA, dwAddr_x, DS_GM_SIZE32, m, nCoreList1);
DSSetMemEx(hBoard, DS_GM_LINEAR_DATA, dwAddr_h_len, DS_GM_SIZE32, h_length, nCoreList2);

#endif
  cim_func_1(x,h,y,j,sum,h_len,conv_len);
/* CIM_RGN end */
#ifdef _SIGC667X
m = sizeof(x)/sizeof(int)/nCores;
DSGetMemEx(hBoard, DS_GM_LD | DS_GM_RDMULT, dwAddr_y, DS_GM_SIZE32, y, m, nCoreList1);
DSGetMemEx(hBoard, DS_GM_LD | DS_GM_RDMULT, dwAddr_sum, DS_GM_SIZE32, sum, m, nCoreList1);

#endif
} /* end of sections */
} /* end of main */
```

FIG. 4B

SOURCE CODE SEPARATION AND GENERATION FOR HETEROGENEOUS CENTRAL PROCESSING UNIT (CPU) COMPUTATIONAL DEVICES

BACKGROUND

The present disclosure generally relates to computing devices, and more particularly to processing source code.

Source code is human-readable code that is eventually converted into something that a computer processor can understand to control input and output devices and/or to perform calculations. In an example, source code may be converted into machine language, which includes logical ones and zeros that present basic instructions for a target central processing unit (CPU) and is executed by the CPU. A compiler translates the source code into binary code that can be directly executed by the target CPU. In an example, the compiler produces "native code" that is executed by the target CPU. The compiler may be specific to the target CPU, and native code may refer to code that is created to run directly only on the type of CPU for which the compiler is designed.

BRIEF SUMMARY

Methods, systems, and techniques for preparing source code for compilation for, and eventual coordinated execution on, a heterogeneous plurality of target CPUs are provided.

According to an embodiment, a method of preparing source code for compilation for, and eventual coordinated execution on, a heterogeneous plurality of target CPUs includes obtaining source code annotated to identify at least a first portion thereof suitable for execution on a first-type subset of the target CPUs. The method also includes based at least in part on a first annotation, separating the source code into first and second source code portions. The method further includes generating from the first source code portion a first source code stream to be supplied for compilation by a first compiler. The first source code stream is augmented, based on the first annotation, to include additional coordination code not present in the obtained source code. The first compiler is specific to the first-type subset of the target CPUs. The method also includes generating from the second source code portion a second source code stream to be supplied for compilation by a second compiler. The second compiler is specific to a second-type subset of the target CPUs. The target CPUs of the first- and second-type subsets have one or more different functionalities.

In an example, the first annotation includes a statement introduced into the source code to mark at least a boundary between the first and second code portions. In another example, the first annotation notates, at least by target CPU type, the first-type subset of the target CPUs for which the augmented first source code stream is to be compiled. In another example, the first annotation notates a number or scale parameter for the first-type subset of the target CPUs for which the augmented first source code stream is to be compiled. According to an embodiment, the target CPUs of the first- and second-type subsets are of respectively different CPU types selected from the set of: one or more general purpose CPU cores; one or more vector, array, or graphics processing units (GPUs); one or more compute intensive multicore CPUs; and one or more one or more low-power CPU cores.

In an example, the coordination code may include a prolog and an epilogue for initialization and clean-up tasks and at least one from a group including code download and initialization per CPU type, run-time data transfer, synchronization, resource management, core allocation, and monitoring code. In another example, the coordination code includes API calls to move run-time data, control, and status operands between target CPUs of the first- and second-type subsets. In another example, the coordination code includes code compilable to coordinate sequencing of run-time code concurrently executing on target CPUs of the first- and second-type subsets.

According to an embodiment, the method further includes supplying the augmented first source code stream to the first compiler for compilation and supplying the second source code stream to the second compiler for compilation. According to an embodiment, the method further includes obtaining a first binary executable program created by the first compiler, where the first compiler compiled the augmented first source code stream into the first binary executable program; and obtaining a second binary executable program created by the second compiler, where the second compiler compiled the second source code stream into the second binary executable program. According to an embodiment, the method further includes supplying the first binary executable program for execution on the first-type subset of the target CPUs and supplying the second binary executable program for execution on the second-type subset of the target CPUs.

In an example, the first source code stream is augmented, based on the first annotation, to include a reference to the second binary executable program. In another example, the second source code stream is augmented, based on the first annotation, to include additional coordination code not present in the obtained source code, where such coordination code may include code download and initialization per CPU type, run-time data transfer, synchronization, resource management, core allocation, and various types of monitoring, including core usage, memory usage, and thermal tracking. In another example, at least one target CPU of the first-type subset includes run-time data I/O resources allowing bypass of a virtualization layer, where the first source code portion includes input, processing, and output that is targeted to one or more run-time data I/O resources, and the coordination code includes code to support run-time data I/O.

According to an embodiment, the method further includes based at least in part on a second annotation, separating the source code into a third source code portion. The method further includes generating from the third source code portion a third source code stream to be supplied for compilation by the first compiler, the third source code stream augmented, based on the second annotation, to include additional coordination code not present in the obtained source code, where such coordination code may include code download and initialization per CPU type, run-time data transfer, synchronization, resource management, core allocation, and various types of monitoring, including core usage, memory usage, and thermal tracking. The method further includes supplying the augmented third source code stream to the first compiler for compilation.

According to another embodiment, a system for preparing source code for compilation for, and eventual coordinated execution on, a heterogeneous plurality of target CPUs includes an input/output interface that facilitates the retrieval of annotated source code. The annotated source code identifies at least a first portion thereof suitable for execution on a first-type subset of the target CPUs. The system also includes a source code separator that, based at least in part on a first annotation, separates the source code into first and second source code portions. The system further includes a source code stream pre-processor that generates from the second source code portion a second source code stream to be supplied for compilation by a second compiler. The source code stream pre-processor augments, based on the first annotation, the first source code stream to include additional coordination code not present in the obtained source code. The first compiler is specific to the first-type subset of the target CPUs. The second compiler is specific to a second-type subset of the target CPUs. The target CPUs of the first- and second-type subsets have one or more different functionalities.

In an example, the target CPUs of the first- and second-type subsets are of respectively different CPU types selected from the set of: one or more general purpose CPU cores; one or more vector, array, or graphics processing units (GPUs); one or more high performance multicore CPUs; and one or more low-power CPUs. In another example, the coordination code includes API calls to move run-time data, control, and status operands between target CPUs of the first- and second-type subsets.

According to an embodiment, the compiler compiles the augmented first source code stream to create a first binary executable program for execution on the first-type subset of the target CPUs. The first-type subset of the target CPUs may execute the first binary executable program. In an example, the target CPUs of the first- and second-type subsets reside in a common computing system. In another example, the target CPUs of the first- and second-type subsets reside in distributed computing systems. In another example, at least some of the first-type subset of the target CPUs reside in different computing systems. In another example, at least one target CPU of the first-type subset includes run-time data I/O resources allowing bypass of a virtualization layer, where the first source code portion includes input, processing, and output that is targeted to one or more run-time data I/O resources, and the coordination code includes code to support run-time data I/O.

According to an embodiment, the source code pre-processor, based at least in part on a second annotation, separates the source code into a third source code portion. The source code stream pre-processor may generate from the third source code portion a third source code stream to be supplied for compilation by the first compiler. The source code stream pre-processor may also augment, based on the second annotation, the third source code stream to include additional coordination code not present in the obtained source code, where the source code stream pre-processor supplies the augmented third source code stream to the first compiler for compilation. The system may also include an editor that annotates the source code.

In an example, the first source code stream includes machine-generated source code and the segmented first source code stream is rearranged, re-sequenced, and retimed to communicate with a binary executable program executing on the second compiler. In an example, the coordination code includes at least one from a group including code download and initialization per CPU type, run-time data transfer, synchronization, resource management, core allocation, and various types of monitoring such as core usage, memory usage, and thermal tracking. In another example, the compiler compiles the augmented first source code stream to create a plurality of first binary executable programs for execution on the first-type subset of the target CPUs, and the first-type subset of the target CPUs includes a multicore CPU, and each core executes a different binary executable program of the plurality of first binary executable programs.

According to another embodiment, a non-transitory may be of dissimilar performance and power consumption, sizes, weights, and internal architectures includes a plurality of machine-readable instructions that when executed by one or more processors are adapted to cause the one or more processors to perform a method including: obtaining source code annotated to identify at least a first portion thereof suitable for execution on a first-type subset of the target CPUs; based at least in part on a first annotation, separating the source code into first and second source code portions; generating from the first source code portion a first source code stream to be supplied for compilation by a first compiler, the first source code stream augmented, based on the first annotation, to include additional coordination code not present in the obtained source code, and the first compiler specific to the first-type subset of the target CPUs; and generating from the second source code portion a second source code stream to be supplied for compilation by a second compiler, the second compiler specific to a second-type subset of the target CPUs, where the target CPUs of the first- and second-type subsets have one or more different functionalities.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

FIG. 3 illustrates an example of source code that is annotated for separation, according to an embodiment.

FIGS. 4A and 4B illustrate an example of an augmented source code stream, according to an embodiment.

DETAILED DESCRIPTION

I. Overview

Figure 1:
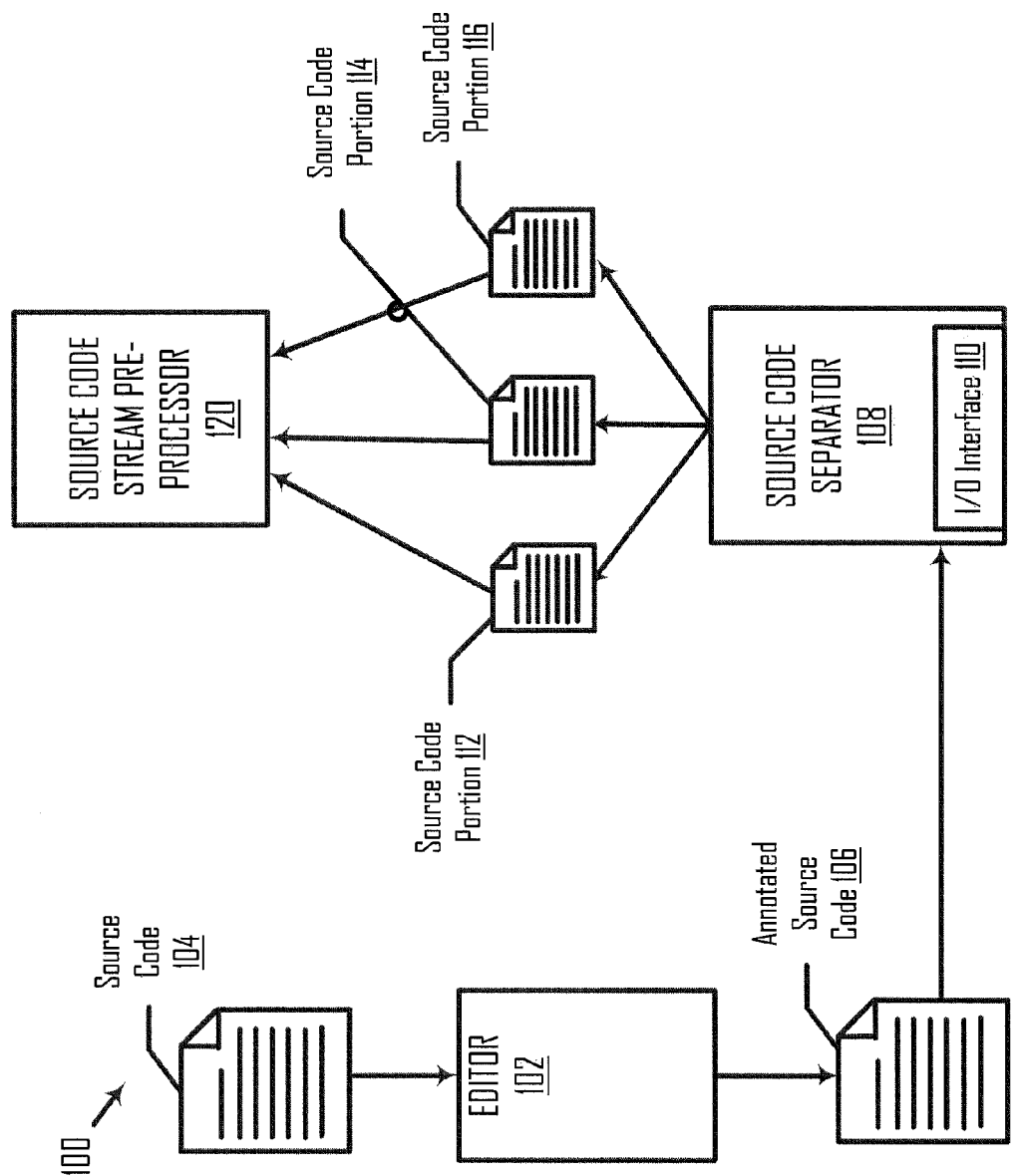
FIG. 1 is a block diagram illustrating a system for preparing source code for compilation for, and eventual coordinated execution on, a heterogeneous plurality of target CPUs, according to an embodiment.

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

The present disclosure provides techniques to process source code in computing systems containing a heterogeneous plurality of central processing units (CPUs). The heterogeneous plurality of CPUs may include substantially different multicore CPU types with disparate characteristics of performance, power consumption, size (e.g., volume), and/or weight. As computing systems evolve to include a heterogeneous plurality of CPUs, it may be desirable to enable programmers to easily and precisely designate and target source code portions within their programs to run on a particular CPU of the heterogeneous plurality of CPUs. Further, it may also be desirable to enable programmers to easily and precisely designate and target source code portions within their programs to run on different cores of a particular multicore CPU of the heterogeneous plurality of CPUs. Such source code sections may be compiled into an executable form that fully and optimally utilizes the target CPU or cores of the target CPU type. Accordingly, the benefits promised by each CPU type (e.g., high performance, low-power consumption, etc) may be achieved without penalties such as having to rewrite source code in a non-readable and/or non-maintainable manner, reduced throughput and higher latency of runtime data input/output, and reduction in the reliability of the computing system due to heat and thermal issues caused by improper use of the various CPU types. The use of a heterogeneous plurality of target CPUs, which may be fundamentally different and manufactured by different semiconductor vendors, to process and run the executables may pose a wide range of problems to achieving these objectives. Examples of fundamentally different CPU types include multicore CPUs designed for HPC (High Performance Computing) and CPUs designed for low power consumption and extended battery life.

The present disclosure provides methods, systems, and techniques for preparing source code for compilation for, and eventual coordinated execution on, a heterogeneous plurality of target CPUs. In an embodiment, a method of preparing source code for compilation for, and eventual coordinated execution on, a heterogeneous plurality of target CPUs includes obtaining source code annotated to identify at least a first portion thereof suitable for execution on a first-type subset of the target CPUs. The method also includes based at least in part on a first annotation, separating the source code into first and second source code portions. The method further includes generating from the first source code portion a first source code stream to be supplied for compilation by a first compiler. The first source code stream is augmented, based on the first annotation, to include additional coordination code not present in the obtained source code, and the first compiler is specific to the first-type subset of the target CPUs. The method also includes generating from the second source code portion a second source code stream to be supplied for compilation by a second compiler. The second compiler is specific to a second-type subset of the target CPUs. The target CPUs of the first- and second-type subsets have one or more different functionalities.

II. Example System Architecture

FIG. 1 is a block diagram 100 illustrating a system for preparing source code for compilation for, and eventual coordinated execution on, a heterogeneous plurality of target CPUs, according to an embodiment. Diagram 100 includes an editor 102 that receives source code 104 in a high-level programming language. Examples of high-level programming languages are the C, C++, COBOL (Common Business Oriented Language), and Java programming languages.

Source code may be stored in text files called source code files that can be opened, viewed, and modified using editor 102. In an example, editor 102 is a text editor. In another example, editor 102 is a code editor that understands the syntax of the programming language and can show different types of instructions in different colors and automatically cross-reference one part of code to a related part of code. Source code 104 may be prepared for compilation for a heterogeneous plurality of target central processing units (CPUs).

Source code 104 is human-readable code that is eventually converted into something that a computer processor can understand to control input and, output devices and/or to perform calculations. In an example, source code 104 may be converted into machine language, which includes logical ones and zeros that present basic instructions for one or more target CPUs and is executed by the one or more target CPUs. A compiler translates source code 104 into binary code that can be directly executed by the one or more target CPUs. In an example, the compiler produces "native code" that is executed by the one or more target CPUs. The compiler may be specific to the target CPU, and native code may refer to code that is created to run directly only on the type of CPU for which the compiler is designed.

A CPU of the heterogeneous plurality of target CPUs may include a single core or multiple cores. In another example, the source code may be converted into machine language that is executed by one or more cores of a target multicore CPU. The compiler may translate the source code into binary code that can be directly executed by each core of the target multicore CPU, and each of the cores may execute a different binary codes (e.g., different binary executable programs). In an example, the compiler produces "native code" that is executed by multiple cores of the target multicore CPU.

Editor 102 may receive source code 104 and annotate it. Source code 104 may be minimally annotated or "marked" by the programmer. In an example, source code 104 may be annotated such that functionally related portions of code, including input, processing, and output, are associated. The associated portions of code may be grouped together, and the multiple functionally related code portions may run concurrently. The functionally related code portions are allocated to one of many possible target CPU cores, or distributed across many possible target CPU cores of a heterogeneous plurality of target CPUs. The quantity of target CPU cores may depend on various factors such as the complexity of a computation or whether a result of the computation is time critical. In an example, two or more target cores are used. In another example, 100 target cores are used. In another example, hundreds of target cores are used. In another example, 1,000 target cores are used.

Table A provides example annotated source code indicating functionally related portions.

TABLE A

```
#pragma start of concurrent portion 1          // line 1
/* source code, for example C language, that shows a first functionally
related portion of source code performing input, processing, and output.
This may be expressed in a few lines of source code to multiple hundreds
of lines of source code) */
/* source code, cont. */
#pragma end of concurrent portion 1            // line 10
/* source code, cont. */
#pragma start of concurrent portion 2          // line 15
/* source code, for example C language, that shows a second functionally
related portion of source code performing input, processing, and output.
This may be expressed in a few lines of source code to multiple hundreds
of lines of source code) */
/* source code, cont. */
#pragma end of concurrent portion 2            // line 24
```

In the example illustrated in Table A, functionally related code portions are indicated by "start" and "end" markers, or pragmas for each portion. Line 1 of Table A indicates the start and line 10 indicates the end of a first source code portion, and line 15 of Table A indicates the start and line 24 indicates the end of the second source code portion. The first and second source code portions may be functionally related code portions that are executed in parallel. In an example, source code 104 is annotated or "marked" by the programmer (e.g., via editor 102), such that functionally related portions of source code requiring direct access to high throughput and low latency I/O available on some CPU types but not others, are associated in order to avoid inefficiencies and bottlenecks in the system (e.g., virtualization, a limited number of I/O ports, and a limited number of instances of key underlying software, such as the operating system and drivers).

Source code 104 may also be annotated to indicate one or more code portions to separate from the source code. Source code may be separated with minimal intervention by the programmer (and possibly no intervention). In an example, annotated source code 106 may include one or more annotations introduced by a programmer to direct the separation of source code 104 into multiple portions. The annotation may identify at least a portion of source code suitable for execution on a particular subset of target CPUs of a heterogeneous plurality of target CPUs. The portion of code may be separated from the source code and prepared for compilation by a particular compiler that is specific to the particular subset of target CPUs. The heterogeneous plurality of target CPUs may include CPU types having disparate performance and power consumption characteristics, volumes (e.g., package sizes), weights, and internal design and architectures (e.g., dissimilar instruction set).

The heterogeneous plurality of target CPUs may include a first-type subset and a second-type subset of target CPUs, where the target CPUs of the first- and second-type subsets have one or more different functionalities. For example, the first- and second-type subsets may be of dissimilar performance and power consumption characteristics, volumes (e.g., package sizes), weights, and internal design and architectures (e.g., dissimilar instruction set). The first-type and second-type subsets of target CPUs may be different in fundamental ways such as, for example, their intended purpose, basic core arithmetic, data transfer architecture, and object code format. Additionally, the first- and second-type subsets of target CPUs may access memory in different ways. The heterogeneous plurality of target CPUs may run functionally unrelated software.

The heterogeneous plurality of target CPUs may include, for example, one or more general purpose CPU cores (e.g., general purpose multicore CPU such as an INTEL® x86 CPU), vector or floating point CPUs, one or more graphics processing units (GPUs), one or more high performance multicore CPUs (e.g., TEXAS INSTRUMENTS® C667x series), and one or more low-power CPUs (e.g., ARM CPU). GPUs and high performance multicore CPUs are typically used in High Performance Computing (HPC) systems. A computing device may include a heterogeneous plurality of CPUs that includes a mix of CPU types rather than only one type. For example, general purpose CPUs (e.g., INTEL® x86 CPU) may be combined with compute intensive CPUs, low-power CPUs, and so on, for processing software allocated on a functional basis among the various CPUs in an optimized and efficient manner. Examples of general-purpose software that may be executed on an x86 CPU include web page processing, storage, and database access and manipulation, used in applications such as search engines, social media user interfaces, and online retail and other transactional websites.

Examples of compute intensive software that may be executed on a high performance multicore CPU include complex algorithms of a mathematical and/or numerical analysis nature, high-speed and/or low-latency data I/O, and large/numerous data sets and matrices, used in applications such as video analytics, artificial intelligence, medical scans, oil and gas exploration, scientific and biotech research, complex modeling, and network packet processing. Examples of low-power software that may be executed on a low-power CPU include virtualization, security, virus infection detection, and other "health" or system housekeeping and monitoring functions. In contrast to a CPU, a GPU contains an "array of vector (or arithmetic) cores" architecture suitable for graphics type operations, with groups of cores assigned to different areas of a memory map representing the graphics display. The memory map may be large and may also represent a data set. Typically, only a small subset of the source code may run on a GPU, due to the GPU's inherent design differences from a CPU; for example a GPU may run only an arithmetic subset of an industry standard programming language such as "C". This list of heterogeneous CPUs is not intended to be limiting, and other types of CPUs are within the scope of the disclosure.

Further, the heterogeneous plurality of target CPUs may co-exist within a common computing device (e.g., server or client computing device) or may be distributed across multiple computing devices. A computing device including a heterogeneous plurality of target CPUs is architecturally more advanced and complex than a computing device including homogeneous CPUs.

Annotated source code 106 may be input into a source code separator 108 that processes the source code. Source code separator 108 may include an input/out interface 110 that facilitates the retrieval of annotated source code 106. In an embodiment, based at least in part on an annotation in annotated source code 106, source code separator 108 separates the source code into a plurality of source code portions. The source code may be separated by causing the source code to be separated into smaller portions of source code. For example, based at least in part on one or more annotations in annotated source code 106, source code separator 108 may separate source code 104 into a first source code portion 112, a second source code portion 114, and a third source code portion 116. In an example, first source code portion 112 is prepared for compilation for a first-type subset of the target CPUs, second source code portion 114 is prepared for compilation for a second-type subset of the target CPUs, and third source code portion 116 is prepared for compilation for a third-type subset of the target CPUs.

Figure 2:
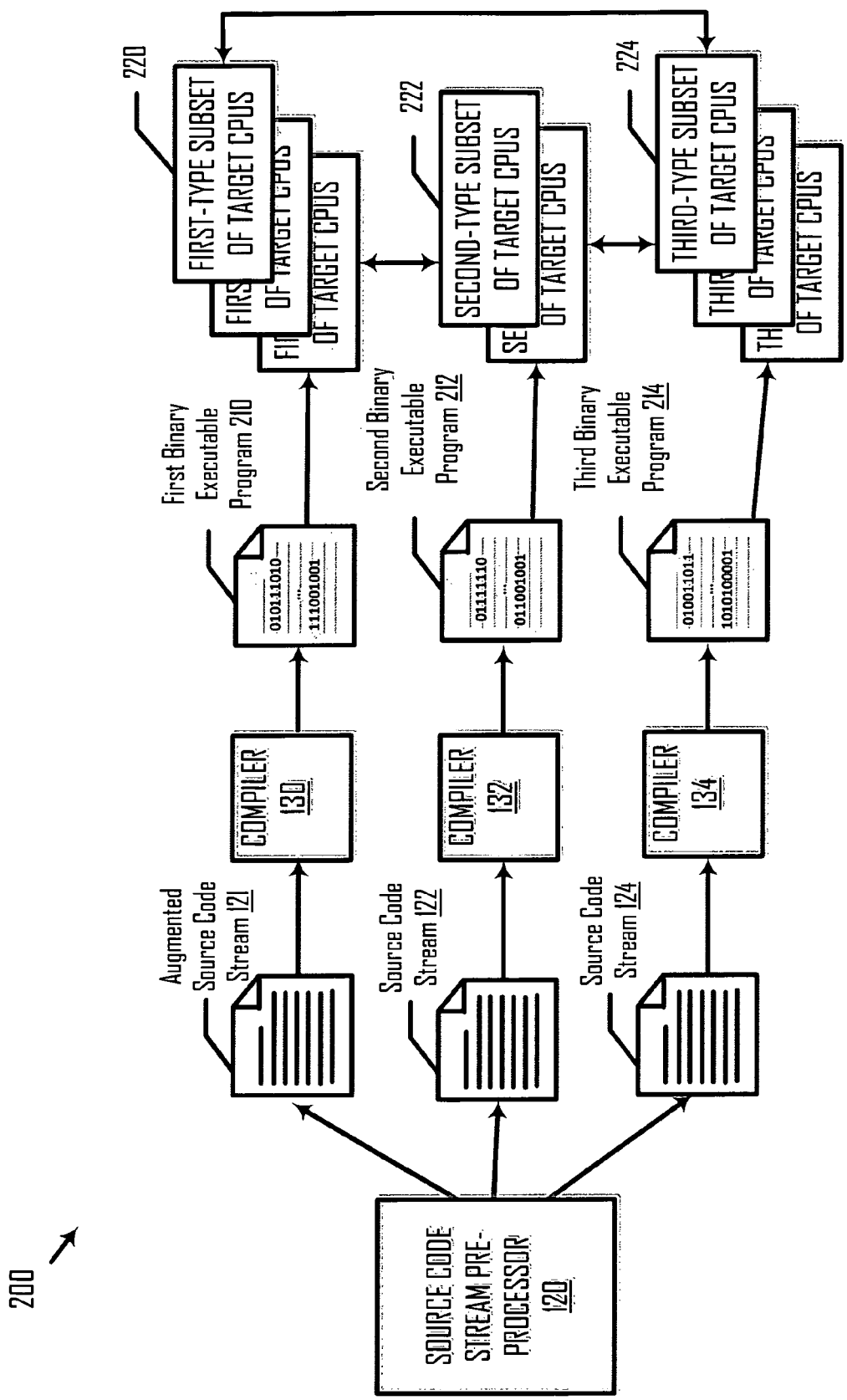
FIG. 2 is a flow diagram illustrating a flow for coordinated execution of prepared source code on the heterogeneous plurality of target CPUs, according to an embodiment.

Diagram 100 also includes a source code stream pre-processor 120. In an embodiment, source code stream pre-processor 120 processes separated source code portions for execution on the heterogeneous plurality of target CPUs. FIG. 2 is a flow diagram 200 illustrating a flow for coordinated execution of prepared source code on the heterogeneous plurality of target CPUs, according to an embodiment. In an embodiment, source code stream pre-processor 120 generates from a separated source code portion a source code stream to be supplied for compilation by a compiler. In an example, a source code stream includes threads, processes, tasks, and other standard concepts that define and control execution on multiple CPUs and/or multiple CPU cores. Source code streams that are unique may be compiled by different CPU types.

One or more markers may be left behind by the source code separation process for processing by source code stream pre-processor 112. In an example, source code separator 108 inserts markers into separated source code portions for processing by source code stream pre-processor 112. A marker may inform source code stream pre-processor 112 how to process the source code portion. For example, a particular marker may indicate to source code stream pre-processor 112 what code to generate and insert into a source code stream or how to augment the source code stream. Markers of different types may include markers indicating requirements for run-time initialization and code download for different CPU/hardware (done transparently to the user), markers indicating memory areas shared between different CPU types (e.g., using "REGION" and "VAR" markers), markers indicating requirements for allocation of resources (e.g., CPU cores and memory), and markers indicating requirements for resource monitoring (e.g., core usage and loading, memory usage, and thermal loading).

In an example, a separated source code portion includes a marker "SIG_INIT" that indicates to source code stream pre-processor 112 where to add an application programming interface (API) call (e.g., DIRECTCORE™ API) for accelerator initialization. As such, source code stream pre-processor 112 may generate from the separated source code portion a first source code stream and augment the first source code stream by identifying the marker and replacing it with the appropriate API call. Accordingly, the first source code stream includes the appropriate API call, which was not present in the original source code that was written by the programmer (e.g. source code 104).

In another example, a separated source code portion includes a marker "SIG_NUM_CORES" that indicates to source code stream pre-processor 112 the number of CPU cores used for a particular region of source code. In another example, a separated source code portion includes a marker "SIG_RGN vartype N" that indicates to source code stream pre-processor 112 where variables should be added for particular regions of the source code. In another example, a separated source code portion includes a marker "SIG_VAR" that indicates to source code stream pre-processor 112 where global and local variables should be added if needed by a particular region of the source code. The "SIG_VAR" may appear within the "SIG_RGN" section.

In keeping with the above example, source code stream pre-processor 120 may generate from first source code portion 112 a first source code stream to be supplied for compilation by a compiler 130, may generate from second source code portion 114 a second source code stream 122 to be supplied for compilation by a compiler 132, and may generate from third source code portion 116 a third source code stream 124 to be supplied for compilation by a compiler 134.

Additionally, functionally related portions of code including the input, processing, and output, may be assigned to one or more separated source code streams. Data consumed and output by the processing of a source code portion may remain connected in close proximity, both in terms of memory and CPU core, with their associated source code streams. This may be of particular importance in server based applications, where high-speed, low-latency data may be accessible by one type of CPU in a heterogeneous CPU system, but not by other types of CPUs.

Each generated source code stream may result in one or more binary executable programs that are suitable for the same target CPU type. In an example, each binary executable program may run on one CPU core and there may be hundreds to thousands of CPU cores. In an example, binary executable programs for all cores of the same CPU type (regardless of the number of devices and CPU cores) are generated with a build process that assumes a specific instruction architecture, the presence of a common operating system controlling all cores (or residing on all cores), and shared memory connecting all devices and CPU cores.

Further, a source code stream may be augmented in order to create one or more binary executable programs suitable for a heterogeneous plurality of target CPUs. The source code stream may be augmented to include various instructions. For example, the source code stream may be augmented to allow multiple binary executable programs to synchronize and communicate with each other during run-time. In an example, based at least in part on an annotation, source code stream pre-processor 120 augments the first source code stream to include additional coordination code not present in the obtained source code to produce an augmented source code stream 121. In such an example, the coordination code may include code download and initialization per CPU type, run-time data transfer, synchronization, resource management, core allocation, and various types of monitoring, including core usage, memory usage, and thermal tracking. The coordination code may also include a prolog and an epilogue for initialization and clean-up tasks. The coordination code may also include API calls to move run-time data, control, and status operands between target CPUs of the first- and second-type subsets.

A source code stream may be augmented and instrumented by machine-generated source code, with source code being rearranged, re-sequenced and retimed as necessary. For example, source code stream pre-processor 112 may augment the first source code stream to include machine-generated source code, where the augmented first source code stream is rearranged, re-sequenced, and retimed to communicate with a binary executable program executing on the second compiler. Although the first source code stream has been described as being augmented, this is not intended to be limiting and other source streams may be augmented as provided in the present disclosure. In an example, source code stream pre-processor 120 augments, based on an annotation, the second source code stream to include additional coordination code not present in the obtained source code. Such coordination code may include code download and initialization per CPU type, run-time data transfer, synchronization, resource management, core allocation, and various types of monitoring, including core usage, memory usage, and thermal loading and tracking. The first and second source code streams may be augmented based on the same annotation or different annotations.

A generated source code stream may include multiple portions of source code and may be extensively augmented from the original source code created by the programmer. In an example, the augmented source code stream includes additional source code to enable source code portions to run correctly on a heterogeneous plurality of target CPUs without requiring the programmer to have specific knowledge of the different type subsets of the target CPUs, different source code portions to communicate and synchronize with each other at run-time, and/or data to be transferred between memories of different type subsets of the target CPUs at run-time.

FIG. 3 illustrates an example of annotated source code 106 that is annotated for separation from the source code into a plurality of source code portions, according to an embodiment. Although annotated source code 106 includes annotations for separation of the source code into portions, no code portions have been separated from the source code nor compiled yet. The programmer may annotate portions of the source code to indicate which CPU, which CPU core, degree of parallelism, and other portions of source code should be run concurrently without having to rewrite source code or alter it from the natural form and style best suited to solve the complex problem.

In the example illustrated in FIG. 3, annotated source code 106 may include a first source code portion including the main function that may be coordinated for execution on compiler 130. The preparation of the first source code portion may be targeted to execute on a first-type subset of the target CPUs, which may include one or more general purpose processor cores (e.g., generic x86 CPUs). Annotated source code 106 in FIG. 3 also includes a second source code portion including a convolution operation at lines 12-15 that may be coordinated for execution on compiler 132. The preparation of the second source code portion may be targeted to execute on a second-type subset of the target CPUs, which may include one or more high performance multicore CPUs (e.g., compute intensive CPUs). The convolution operation is annotated with a "pragma" that marks the portion of code for a separate source code stream and is compute-intensive. According, the compute-intensive source code stream may be generated from the convolution operation. Annotated source code 106 in FIG. 3 also includes a third source code portion including a matrix multiply operation at lines 21-23 that may be coordinated for execution on compiler 134. The preparation of the third source code portion may be targeted to execute on a third-type subset of the target CPUs, which may include one or more low-power CPUs (e.g., TEXAS INSTRUMENTS® C66x CPU). Trademarks are the properties of their respective owners.

The convolution and matrix multiply operations may be executed in parallel. A first operation executes in parallel with a second operation when execution of the first and second operations has some overlap. In an example, the first operation may execute on a first CPU during a period of time in which the second operation is executing on a second CPU. In another example, the first operation may start executing on the first CPU and stop before completion, the second operation may start executing on the second CPU and stop before completion, and the first operation may resume executing on the first CPU and finish. In another example, the second operation may start executing on the second CPU and stop before completion, the first operation may start executing on the first CPU and stop before completion, and the second operation may resume executing on the second CPU and finish.

The annotated source code may be processed by source code separator 108. Source code separator 108 may recognize particular annotation keywords. The annotation syntax may be, for example, OpenMP style syntax. Other syntax styles are within the scope of the disclosure. In the example illustrated in FIG. 3, annotated source code 106 includes three annotation keywords, "for," "portions," and "portion," that are recognized by source code separator 108 when used in the syntax "#pragma cim parallel [annotation keyword]." At line 8 of FIG. 3, the annotation keyword "portions" indicates the code block with several sub-blocks that are to be parallelized for execution. At lines 9 and 19 of FIG. 3, the annotation keyword "portion" indicates the code block that is to be executed on a core number given either explicitly (not shown in FIG. 3) or implicitly in which case the source code pre-processor allocates CPU cores using pre-determined rules combined with dynamic feedback from cores of their current usage loading. At lines 10 and 20 of FIG. 3, the annotation keyword "for" indicates splitting of the "for" loop into a number of parts given by num_threads. In an example, an annotation notates a number or scale parameter for the first-type subset of the target CPUs for which the augmented source code stream is to be compiled. For example, in FIG. 3, the number of parts indicated by num_threads is two, and thus the "for" loop will be split into parallel parts, each part executing one half of the total "compute work" specified in the for loop. In another example, if the number indicated by num_threads is "N", where N is an integer greater than one, the "for" loop may be split into N parallel parts, each part executing 1/N of the total "compute work" specified in the for loop. The number of parts given by num_threads may have a default value. In an example, the number of parts given by num_threads has a default value of eight. Other default values given by num_threads may be greater than or less than eight and are within the scope of the disclosure. In another example, an annotation notates, at least by target CPU type, the first-type subset of the target CPUs for which an augmented source code stream is to be compiled.

The annotation keywords are not intended to be limiting and more, fewer, or different annotation keywords may be used. Further, other embodiments may use the same or different syntax. In an example, an annotation includes a statement introduced into the source code to mark at least a boundary between first and second source code portions. For example, the annotation keyword, "offload," may be used in the syntax "#pragma cim parallel [annotation keyword]" and indicates the code block with a particular portion identifier that is to be executed as if the code block were a binary code portion. In another example, the annotation keyword "offload_sec" may be used in the syntax "#pragma cim [annotation keyword]" and used to mark the location in the source code where an offload with the corresponding portion identifier is to start executing.

Figure 4:
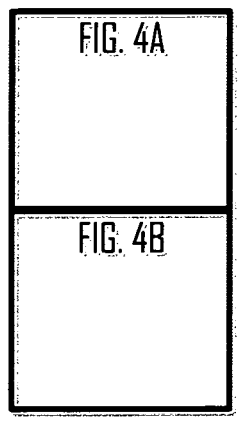
FIG. 4 illustrates a relationship between FIGS. 4A and 4B.

FIG. 4 illustrates a relationship between FIGS. 4A and 4B. FIGS. 4A and 4B illustrate an example of an augmented source code stream 121A, 121B, according to an embodiment. In an example, from a separated source code portion, source code stream pre-processor 112 generates augmented source code stream 121A, 121B. Augmented source code stream 121A, 121B may include additional coordination code not present in annotated source code 106. The coordination code may include code API calls necessary to move run-time data, control, status, and other run-time operands between the heterogeneous plurality of target CPUs (e.g., the first- and second-type subsets of the target CPUs). For example, the coordination code may include code compilable to pass run-time operands between the heterogeneous plurality of target CPUs. The coordination code may also include code compilable to coordinate sequencing of run-time code concurrently executing on the heterogeneous plurality of target CPUs.

In an example, based on one or more annotations in the source code, source code stream pre-processor 112 may generate from a separated source code portion a source code stream, generate source code, and augment the source code stream by inserting the generated source code into the source code stream. The augmented source code stream may include modifications to the initial source code stream to initialize, run, and communicate with a different type of CPU. In an example, source code stream pre-processor 112 generates source code for a variable declaration and initialization, function call, and/or calculation, and augments the source code stream by inserting the generated source code into the source code stream. A function call may include an API call. In an example, the function is an API call to a product that includes a library and a driver that allows direct access to an accelerator inside a computing device including the heterogeneous plurality of target CPUs. In such an example, one or more CPUs of the heterogeneous plurality of target CPUs may include multiple cores. Augmented source code stream 121A, 121B may be an extensively augmented version of the original source code without the portion marked by pragmas in FIG. 3, and augmented with additional source code to initialize, run, and communicate with an array of, for example, compute intensive CPU cores.

In another example, the first source code stream is augmented, based on an annotation, to include a reference to a binary executable program. In an example, the first source code stream is augmented, based on the annotation, to include a reference to a binary executable program associated with another source code stream. For example, the source code in boxes 402 and 404 of augmented source code stream 121B of FIG. 4B may be references to second binary executable program 212 corresponding to source code stream 122 and to third binary executable program 214 corresponding to source code stream 124, respectively. In particular, the source code in box 402, which includes "convolution.out" as a parameter, may enable first binary executable program 210 to call second binary executable program 212 corresponding to the convolution operation, and the source code in box 404, which includes "matmultiply.out" as a parameter, may enable first binary executable program 210 to call third binary executable program 214 corresponding to the matrix multiply operation.

It is important to note that augmented source code stream 121 and source code streams 122 and 124 are still in a high-level programming language and have not yet been compiled. Source code stream pre-processor 112 may supply each of the source code streams to a compiler that is specific to a subset type of a heterogeneous plurality of target CPUs. In an example, source code stream pre-processor 120 may supply augmented first source code stream 121 to compiler 130 for compilation, may supply second source code stream 122 to compiler 132 for compilation, and may supply third source code stream 124 to compiler 134 for compilation. Compiler 130 may be specific to a first-type subset of the target CPUs, compiler 132 may be specific to a second-type subset of the target CPUs, and compiler 134 may be specific to a third-type subset of the target CPUs, where the first-, second-, and third-type subsets have one or more different functionalities. In an example, the first-, second-, and third-type subsets may be of dissimilar performance and power consumption characteristics, volumes (e.g., package sizes), weights, and internal design and architectures (e.g., dissimilar instruction set) relative to each other.

As part of the compilation process, object code files are created. During the compilation process, source code files may be compiled into object code files, which are then linked into code libraries or binary executable programs. Compilation of source code includes many stages. Some high-level programming languages (e.g., C and C++) start compilation by running a preprocessor on the source code input. For example, compiler 130 may run a preprocessor on augmented source code stream 120, compiler 132 may run a preprocessor on source code stream 122, and compiler 134 may run a preprocessor on source code stream 124. The preprocessor stage is a stage of compilation that happens prior to the actual processing of the bulk of the source code. The preprocessor is a program that replaces patterns in the source code with other patterns that the programmer has defined (e.g., by using preprocessing directives). Preprocessor directives are used to save typing and to increase the readability of the code. Also during the preprocessing stage, the compiler takes raw source files and prepares them for the compilation process itself. In an example, source code stream pre-processor 112 may generate Makefiles to build the source code. A Makefile is a special format file that enables a programmer to automatically build and manage the source code (stored in multiple source code files) without having to type in the compile command for each source code file.

As discussed, the heterogeneous plurality of target CPUs may include a first-type subset of target CPUs 220, a second-type subset of target CPUs 222, and a third-type subset of target CPUs 224. In an example, compiler 130 is specific to the first-type subset of target CPUs 220 and may compile augmented source code stream 121 to create a binary executable program 210 for execution on the first-type subset of target CPUs 210. Compiler 130 may supply binary executable program 210 for execution on first-type subset of target CPUs 220. In turn, first-type subset of target CPUs 220 may obtain binary executable program 210 created by compiler 130 and execute the binary executable program, which may communicate with other binary executable programs.

Additionally, compiler 132 is specific to the second-type subset of target CPUs 222 and may compile source code stream 122 to create a binary executable program 212 for execution on the second-type subset of target CPUs 222. Compiler 132 may supply binary executable program 212 for execution on second-type subset of target CPUs 222. In turn, second-type subset of target CPUs 222 may obtain binary executable program 212 created by compiler 132 and execute the binary executable program. Additionally, compiler 134 is specific to the third-type subset of target CPUs 224 and may compile source code stream 124 to create a binary executable program 214 for execution on the third-type subset of target CPUs 224. Compiler 134 may supply binary executable program 214 for execution on third-type subset of target CPUs 224. In turn, third-type subset of target CPUs 224 may obtain binary executable program 216 created by compiler 134 and execute the binary executable program.

Figure 5:
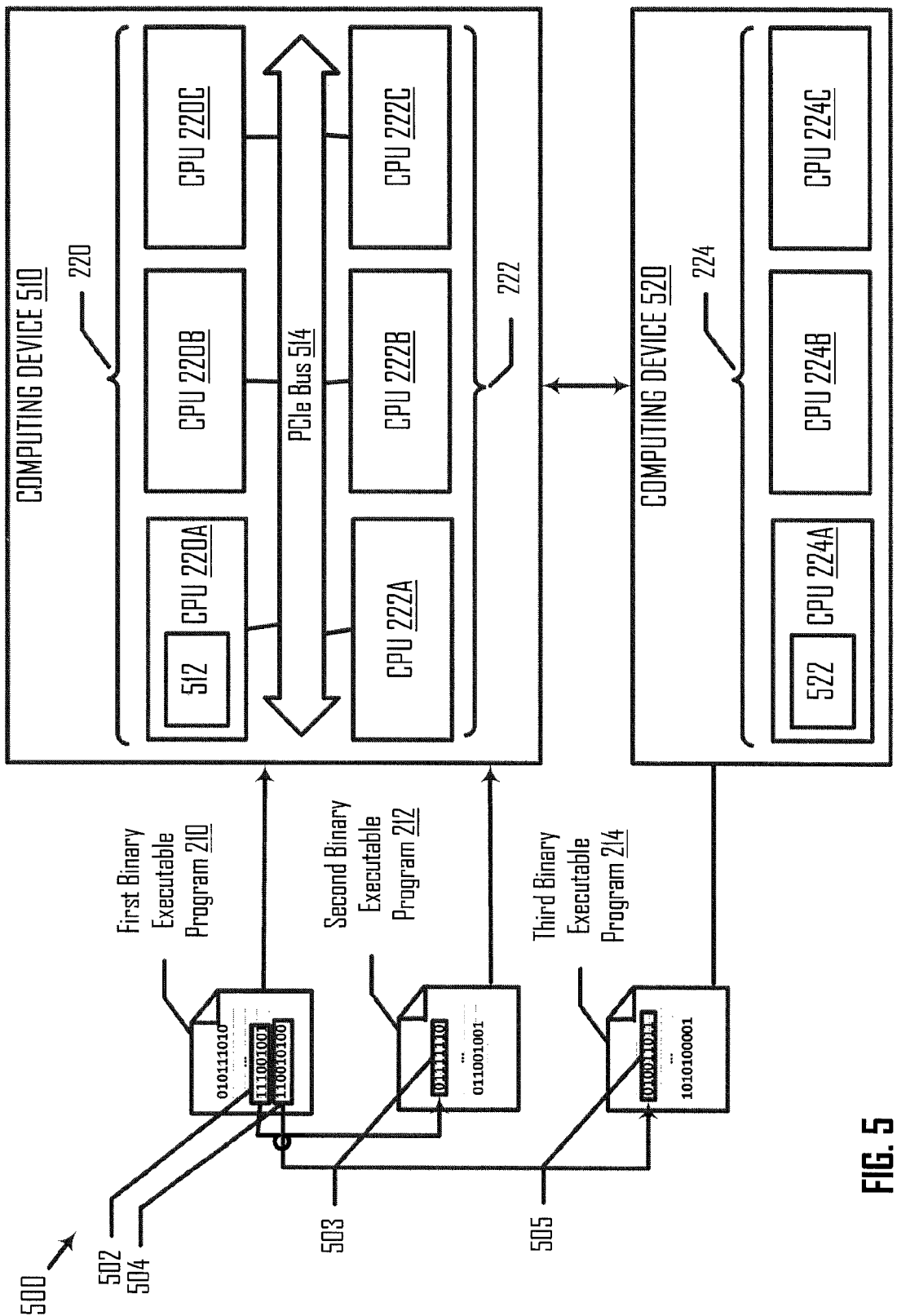
FIG. 5 is a block diagram illustrating binary executable programs being supplied to the heterogeneous plurality of target CPUs, according to an embodiment.

FIG. 5 is a block diagram 500 illustrating binary executable programs being supplied to the heterogeneous plurality of target CPUs, according to an embodiment. In FIG. 5, first binary executable program 210 includes binary code in box 502 that corresponds to the source code in box 402 (in FIG. 4B) after it has been compiled. The binary code in box 502 references binary code in box 503 of second binary executable program 212. For example, the binary code in box 502 may call or communicate with second binary executable program 212 via the reference. Additionally, first binary executable program 210 includes binary code in box 504 that corresponds to the source code in box 404 (in FIG. 4B) after it has been compiled. The binary code in box 504 references binary code in box 505 of third binary executable program 214. For example, the binary code in box 504 may call or communicate with third binary executable program 214 via the reference.

First binary executable program 210 may be supplied to first-type subset of target CPUs 220 for execution, and second binary executable program 212 may be supplied to second-type subset of target CPUs 222 for execution. In the example illustrated in FIG. 5, first-type subset of target CPUs 220 and second-type subset of target CPUs 222 reside in a common computing device 510 that includes a heterogeneous plurality of target CPUs. First-type subset of target CPUs 220 includes CPUs 220A, 220B, and 220C, and second-type subset of target CPUs 222 includes CPUs 222A, 222B, and 222C. First-type subset of target CPUs 220 and second-type subset of target CPUs 222 are of different types and may communicate via a Peripheral Component Interconnect Express (PCIe) bus 514. Computing device 510 may be programmed to achieve high performance with minimal effort and awareness of CPU differences on the part of the programmer.

Computing device 510 may also include a shared memory 512 that is shared between first binary executable program 210 and one or more other binary executable programs. In an example, shared memory 512 is shared between first binary executable program 210 and second binary executable program 212. In another example, shared memory 512 is shared between first binary executable program 210 and third binary executable program 214. In another example, shared memory 512 is shared between first binary executable program 210, second binary executable program 212, and third binary executable program 214. Additionally, binary executable programs may synchronize and/or pass messages to each other via shared memory 512 or by sending a communication over the network to a computing device that is executing the particular binary executable.

Third binary executable program 214 may be supplied to a third-type subset of target CPUs 224 for execution. In the example illustrated in FIG. 5, third-type subset of target CPUs 224 resides in a computing device 520 and includes CPUs 224A, 224B, and 224C. Computing device 520 includes a memory 522 that third binary executable program 214 may share with one or more other binary executable programs (e.g., first binary executable program 210 and/or second binary executable program 212).

Although the first- and second-type subsets of target CPUs are illustrated as being in a first computing device and the third-type subset of target CPUs is illustrated as being in a second computing device different from the first computing device, this is not intended to be limiting. For example, first-type subset of target CPUs 220, second-type subset of target CPUs 222, and third-type subset of target CPUs 224 may reside in computing device 510. In such an example, computing device 510 may be programmed to achieve high performance (e.g., via second-type subset of target CPUs 222), low-power consumption (e.g., via third-type subset of target CPUs 224) (e.g., increased efficiency) operation with minimal effort and awareness of CPU differences on the part of the programmer. In another example, first-type subset of target CPUs 220, second-type subset of target CPUs 222, and third-type subset of target CPUs 224 reside in distributed computing devices.

Additionally, one or more of the CPUs of a subset type may reside in a common computing device or a different computing device. In an example, at least some of the CPUs of first-type subset of target CPUs 220 reside in different computing systems. For example, CPUs 220A and 220B may reside in computing device 510 and CPU 220C may reside in computing device 520. In such an example, CPUs 220A and 220B are located remotely from CPU 220C and do not share memory or communicate via standard techniques. A "remote" source code stream may be generated for a remote CPU type (same or different CPU type) and sent to the remote CPU for execution and run-time coordination, using the same techniques described herein, as if the remote CPU type were present in the same computer system as the local CPU types.

Figure 6:
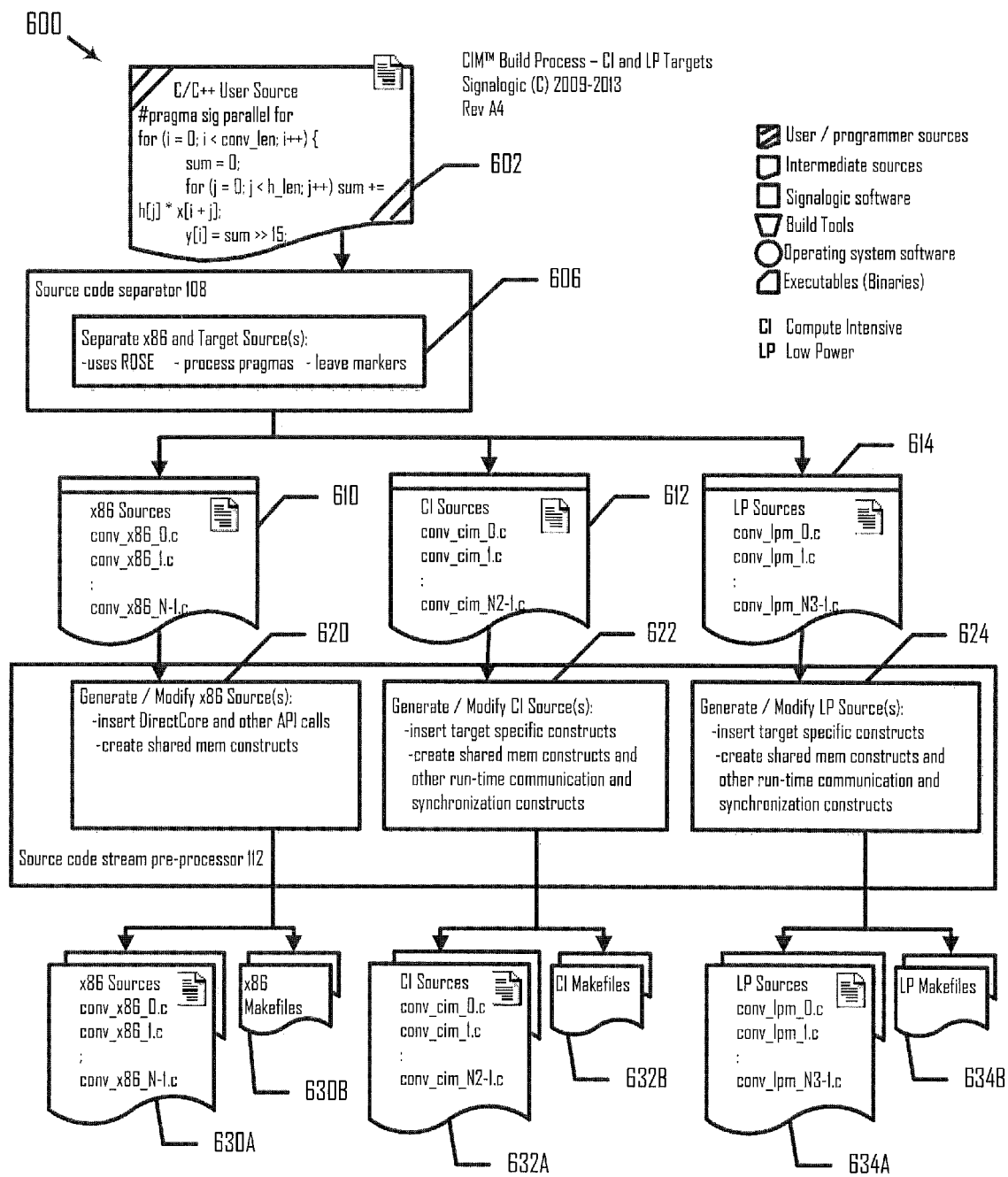
FIG. 6 is a flow diagram illustrating a flow for preparing source code for compilation for, and eventual coordinated execution on, a heterogeneous plurality of target CPUs, according to an embodiment.

FIG. 6 is a flow diagram 600 illustrating a flow for preparing source code for compilation for, and eventual coordinated execution on, a heterogeneous plurality of target CPUs, according to an embodiment. Flow diagram 600 includes annotated C/C++ source code 602 that includes annotations in the OpenMP style syntax. In annotated source code 602, "#pragma sig parallel for" is a source code annotation.

Source code 602 may be input into source code separator 108 for processing. In a block 606, based at least in part on one or more annotations in annotated source code 602, source code separator 108 separates the annotated source code into a plurality of source code portions for, and eventual coordinated execution on, a heterogeneous plurality of target CPUs including a target x86. CPU and other target CPUs. In the example illustrated in FIG. 6, source code separator 108 may use ROSE to process the annotations (e.g., pragmas) and may leave the markers for processing by source code stream pre-processor 112. Although ROSE has been described, this is not intended to be limiting and any tool can be used to provide basic manipulation/mechanics of source code separation (including ones written by the programmer).

Source code separator 108 separates annotated source code 602 into an x86 source code portion 610 targeted at INTEL® x86 CPUs commonly found in industry servers, a compute intensive source code portion 612 targeted at an array of compute intensive multicore CPUs suitable for complex algorithm processing, and a low-power source code portion 614 targeted at an array of one or more low-power CPU coress targeted at low power consumption and extended battery life. Compute intensive source code portion 612 includes source code targeted at high performance, compute intensive operation to be compiled by a compiler that is specific to one or more target compute intensive CPUs (e.g., high performance multicore CPUs) of the heterogeneous plurality of target CPUs. Low-power source code portion 614 includes source code targeted at low power consumption/extended battery life operation to be compiled by a compiler that is specific to one or more target low-power CPUs of the heterogeneous plurality of target CPUs.

Source code stream pre-processor 112 may process each of the source code portions to prepare it for execution on one or more target CPUs. The x86 source code portion 610 includes source code to be compiled by a compiler that is specific to one or more target x86 CPUs of the heterogeneous plurality of target CPUs. In a block 620, source code stream pre-processor 112 generates from x86 source code portion 610 a first source code stream, and augments, based on an annotation, the first source code stream to include additional coordination code not present in annotated source code 602. The coordination code may include code download and initialization as needed by the CPU type, run-time data transfer, initialization and code download per CPU type, synchronization, resource management, core allocation, and various types of monitoring, including core usage, memory usage, and thermal tracking Accordingly, source code stream pre-processor 112 may generate an augmented x86 source code stream including an x86 source code stream 630A and a Makefile 630B. In an example, source code stream pre-processor 112 augments the first source code stream by inserting API calls (e.g., DIRECT-CORE™ API calls) and creating shared memory constructs. An example of an inserted API call is "DSLoadFileCore (hBoard, 'convolution.out', nCoreList1)" at line 3 and "DSLoadFileCore(hBoard, 'matmultiply.out', nCoreList2)" at line 4 of augmented source code stream 121B of FIG. 4B.

Compute intensive source code portion 612 includes source code to be compiled by a compiler that is specific to one or more target compute intensive CPUs (e.g., high performance multicore CPUs) of the heterogeneous plurality of target CPUs. In a block 622, source code stream pre-processor 112 generates from compute intensive source code portion 612 a second source code stream, and augments, based on an annotation, the second source code stream to include additional coordination code not present in annotated source code 602. The coordination code may include code download and initialization as needed by the CPU type, run-time data transfer, initialization and code download per CPU type, synchronization, resource management, core allocation, and various types of monitoring, including core usage, memory usage, and thermal tracking. Accordingly, source code stream pre-processor 112 may generate an augmented compute intensive source code stream including a compute intensive source code stream 632A and a Makefile 632B. In an example, source code stream pre-processor 112 augments the second source code stream by inserting RTAF (Real-Time Algorithm Framework) API calls and target specific constructs (e.g., compute intensive CPU-specific constructs and optimizations). Source code stream pre-processor 112 may also create shared memory constructs and other run-time communication and synchronization constructs. In an example, the compute intensive CPU-specific constructs and optimizations are directed to TEXAS INSTRUMENTS® build tools and software modules. In such an example, the "_TI66X definition" may be inserted into generated source code to differentiate source code specific to the TI C66x CPU type (and possibly incompatible with x86 CPU type).

Low-power source code portion 614 includes source code to be compiled by a compiler that is specific to one or more target low-power CPUs of the heterogeneous plurality of target CPUs. In a block 624, source code stream pre-processor 112 generates from low-power source code portion 612 a third source code stream, and augments, based on an annotation, the third source code stream to include additional coordination code not present in annotated source code 602. The coordination code may include code download and initialization as needed by the CPU type, run-time data transfer, initialization and code download per CPU type, synchronization, resource management, core allocation, and various types of monitoring, including core usage, memory usage, and thermal loading and tracking. Accordingly, source code stream pre-processor 112 may generate an augmented low-power source code stream including a low-power source code stream 634A and a Makefile 634B. Source code stream pre-processor 112 may also create shared memory constructs and other run-time communication and synchronization constructs.

Accordingly, source code separator 108 and source code stream pre-processor 112 may transform original source code into precisely coordinated, synchronized, but separate streams of source code. In an example, the x86 source code including the DirectCore APIs (e.g., running on the x86 CPU cores) transfers contents of the x86 data variables at exactly the right instant to/from correct memory locations and in the right amount into the compute intensive data variables accessed by the compute intensive source code (e.g., running on the high performance multicore CPUs).

Figure 7:
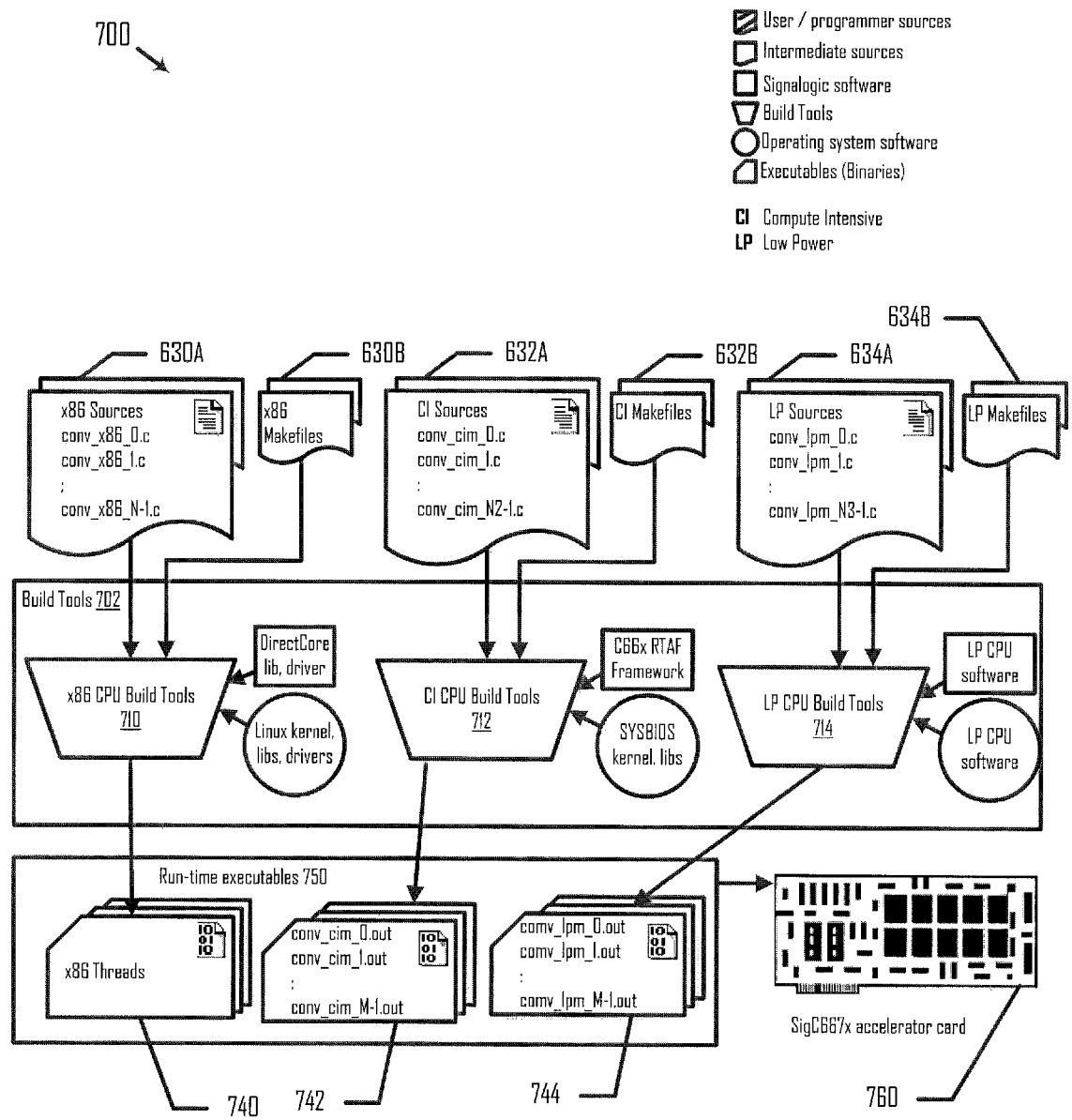
FIG. 7 is a flow diagram illustrating a flow for processing source code streams for compilation and for eventual coordinated execution on a heterogeneous plurality of target CPUs, according to an embodiment.

FIG. 7 is a flow diagram 700 illustrating a flow for processing source code streams for compilation and for eventual coordinated execution on a heterogeneous plurality of target CPUs, according to an embodiment. In an example, source code stream pre-processor 112 may supply the source code streams to build tools 702 for the compilation and linking of the source code streams. Build tools 702 may include a compiler, linker, and assembler. In an example, build tools 702 include scripts, programs (e.g., C programs), libraries (e.g., dynamic linked libraries or shared objects), and drivers. In an example, a series of scripts performs an automated build of the output source code streams. In such an example, "cimpp.sh" may be the master script and causes source code stream pre-processor 112 to search for particular annotation keywords, insert corresponding code, generate files based on a template, and generate a Makefile based on a Makefile template.

In an embodiment, build tools 702 automatically compiles and links ("builds") all source code streams using appropriate build tools for each type of CPU represented in the heterogeneous plurality of target CPUs to create one or more run-time binary executable programs in object code format. Build tools 702 may include an automated build process that builds separated source code portions. For example, build tools 702 may build the separated x86 source code portion (e.g., original source code without the other separated source code portions) using a Gcc tool chain (commonly found on LINUX™ systems), may build separated compute intensive source code portions using the TEXAS INSTRUMENTS® tool chain (commonly used for compute intensive CPU devices), and may build separated low-power source code portions using an ARM (Advanced RISC Machines) processor.

The x86 CPU build tools 710 may use Makefile 630B to compile, link, and assemble the source code stream including the x86 source code stream 630A. The x86 CPU build tool 710 may link with libraries and drivers and the operating system framework to produce one or more executable program files 740. The x86 CPU build tool 710 may be, for example, "gcc." Further, the code using the DirectCore library and driver may be downloaded via a PCUPCEe bus into an accelerator card (or board, typically inserted into a PCIe slot in the computer system) 760 coupled to a computing device. In an example, accelerator card 760 is the SigC667x accelerator card.

Compute intensive CPU build tools 712 may use Makefile 632B to compile, link, and assemble the source code stream including compute intensive source code stream 632A. The compute intensive CPU build tools 712 may link with libraries and drivers and the operating system framework to produce one or more executable program files 742. Compute intensive CPU build tools 712 may be, for example, "c66x" or "cgt." Low-power CPU build tools 714 may use Makefile 634B to compile, link, and assemble the source code stream including low-power source code stream 634A. The low-power CPU build tools 714 may link with libraries and drivers and the operating system framework to produce one or more executable program files. Low-power CPU build tools 714 may be, for example, ARM tools.

Run-time executables 750 includes the x86 executable program files 740, compute intensive executable program files 742, and low-power executable program files 744. The executable program files may use previously processed and inserted coordination code to communicate with each other during run-time.

Core allocation and loading (more work) may increase the heat of the cores. According, it may be desirable to monitor the thermal map of a multicore array, potentially leading to revised core allocation. In an example, a library and driver software accesses (e.g., via a FPGA (field-programmable gate array) chip) logic on the accelerator to monitor real-time temperature information for each multicore CPU device. The multicore CPU may report its current (e.g., actual) software/ usage loading and a resource management module (not shown) determines whether to vary a multicore CPU's clock rate and/or Vcc (voltage) levels based on various factors such as the load reported by the CPUs, real-time measurements of the thermal map of an array of multicore CPUs, and core loading and usage required by the current user program. In an example, accelerator card 760 has temperature measurement capabilities (or control of CPU clock rate and/or Vcc (voltage) levels) and includes the resource management module. The resource management module may read the temperature information from the accelerator card. Thermal management and measurement of a thermal map of an array of multicore CPUs is described in prior U.S. patent application Ser. No. 13/397,534 to Brower, filed Feb. 15, 2012, entitled "Thermal Management for Integrated Circuits," which is incorporated herein by reference in its entirely, and is also described in prior U.S. patent application Ser. No. 13/398,686 to Brower, filed Feb. 16, 2012, entitled "Thermal Management for Integrated Circuits," which is incorporated herein by reference in its entirely.

The resource management module may execute in the accelerator card and vary the clock rate and/or the Vcc levels of a multicore CPU in a computing device. In an example, the resource management module invokes a kernel module in the computing device. Additionally, the resource management module may vary the clock rate of one core and not another core of a multicore CPU.

Figure 8:
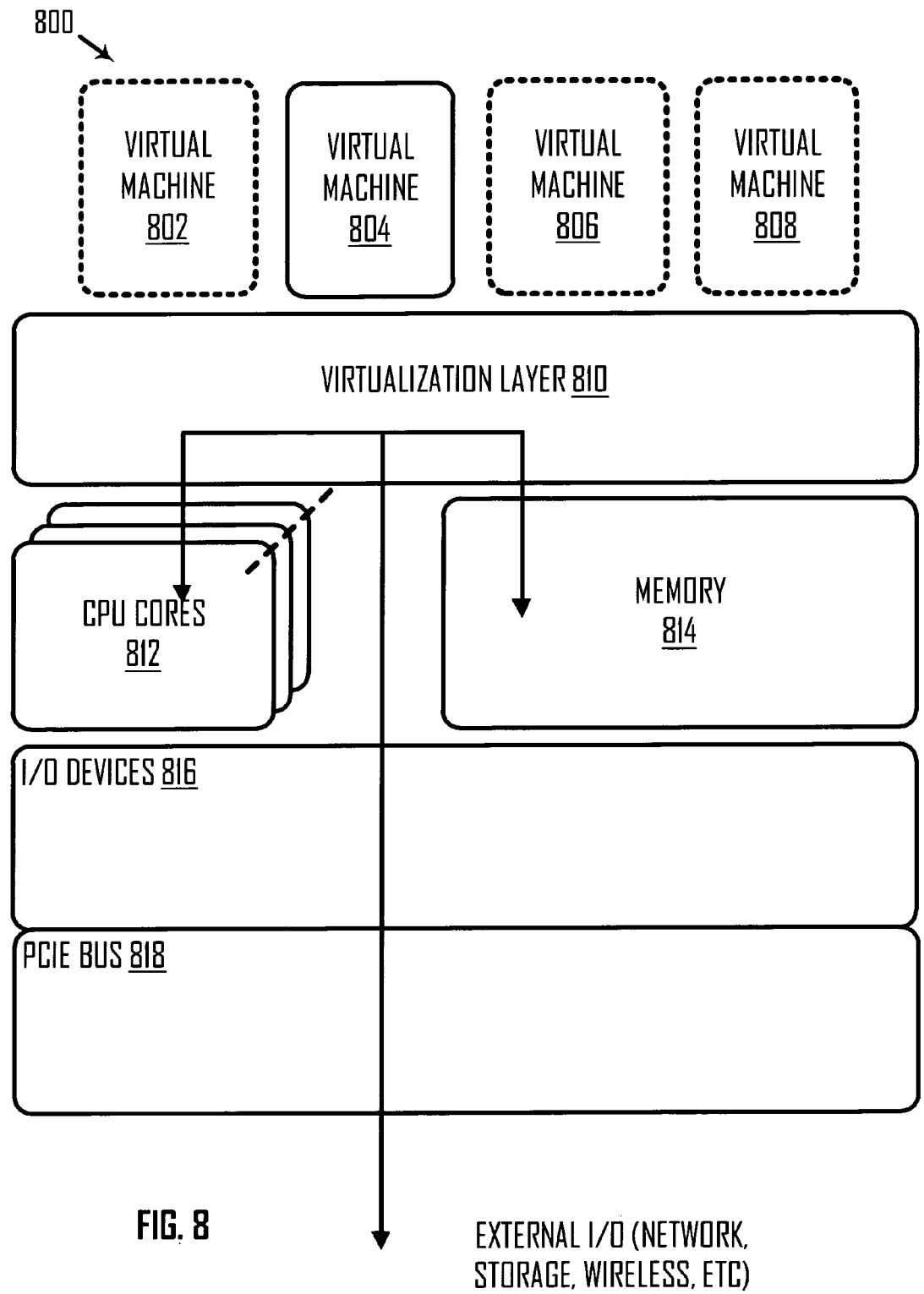
FIG. 8 is a block diagram illustrating an external data I/O path in a virtualized computer system, according to an embodiment.

FIG. 8 is a block diagram illustrating an external data I/O path in a virtualized computer system, according to an embodiment. FIG. 8 includes a host machine 800 coupled to hardware such as CPU cores 812, memory 814, I/O devices 816, and PCIe Bus 818. Host machine 800 may be, for example, a server in a data center. Host machine 800 may run one or more virtual machines that run applications and services. Host machine 800 may include a virtualization layer 810 that creates virtual machines 802, 804, 806, and 808 and provide the virtual machines with access to hardware devices to perform input/output (I/O). A virtual machine may run a guest operating system (OS) that may be different from another guest OS system running in another virtual machine and may also be different from the host OS running on host machine 801 (not shown). The host or guest OS may include, for example, MICROSOFT® WINDOWS®, LINUX®, SOLARIS®, and MAC® OS. Trademarks are the property of their respective owners. Virtualization layer 810 may run top of the host OS.

Virtual machine 804 may be a currently active virtual machine. Virtual machines 802, 806, and 808 may be currently inactive virtual machines, as indicated by the dashed lines. An active virtual machine may communicate with external I/O devices (e.g., network, storage, and wireless devices), CPU cores 812, and memory 814 through virtualization layer 810.

In an embodiment, at least one at least one target CPU of the first-type subset includes a run-time data I/O resources allowing bypass of a virtualization layer, where the first source code portion includes input, processing, and output that is targeted to one or more run-time data I/O resources, and the coordination code includes code to support run-time data I/O. In an embodiment, at least one target CPU of the first-type subset includes a virtual resource exposed by a virtualization resource. In an example, a target CPU may include run-time data I/O resources that are bypassed to computing system's virtualization layer, resulting in increased run-time data I/O throughput and decreased latency. The run-time data I/O resources may be targeted by source code stream pre-processor 112. In such an example, annotated and subsequently separated source code portions may include input, processing, and output targeted to a run-time data I/O resource. Additionally, the coordination code may include code required to support such run-time I/O.

Figure 9:
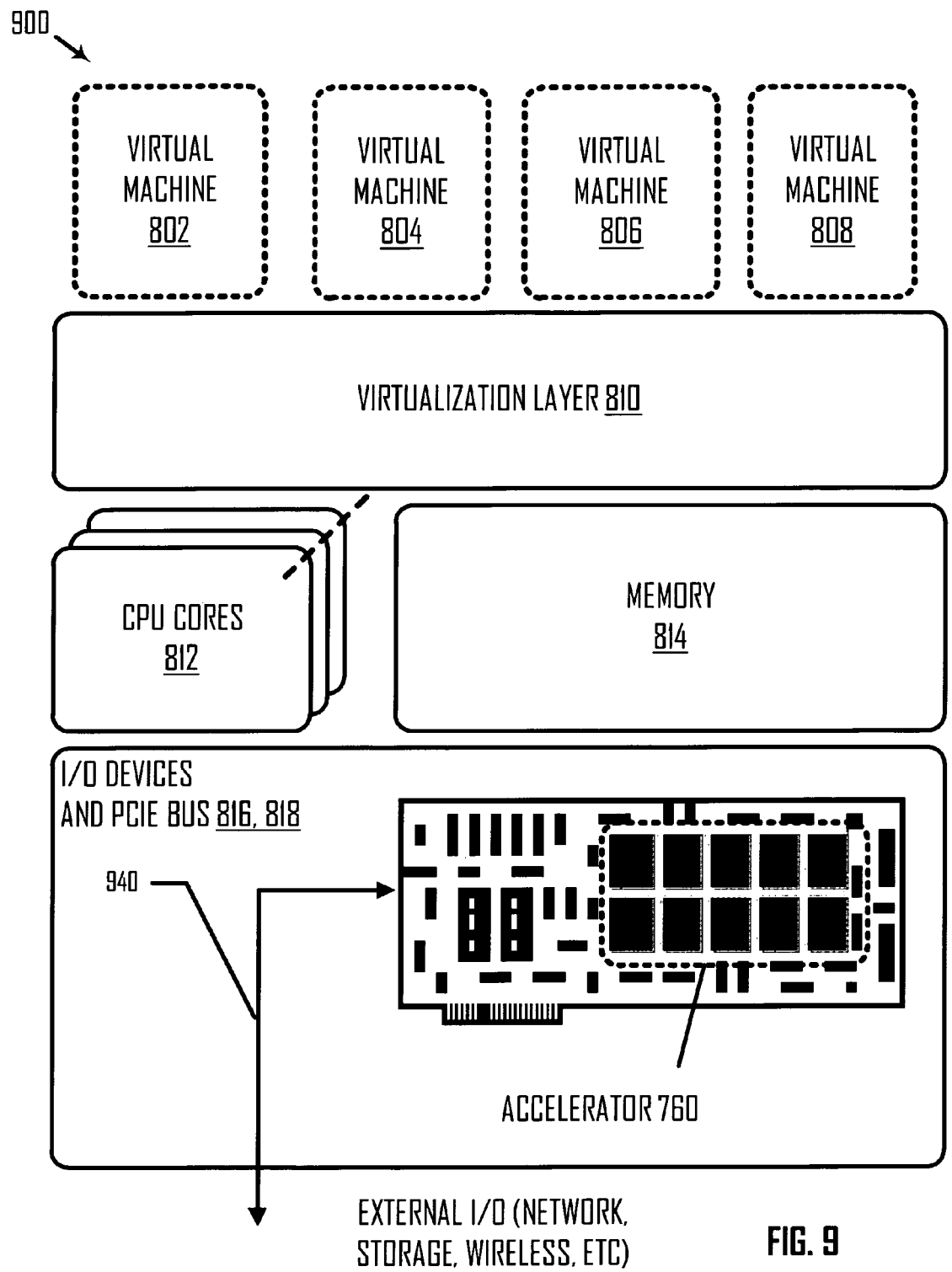
FIG. 9 is a block diagram illustrating an external data I/O path to and from an accelerator in a virtualized computer system, according to an embodiment.

FIG. 9 is a block diagram illustrating an external data I/O path to and from an accelerator in a virtualized computer system, according to an embodiment. FIG. 9 includes host machine 800 coupled to hardware such as CPU cores 812, memory 814, and I/O devices and PCIe Bus 816, 818. Host machine 800 includes an accelerator 760 with an array of multicore CPUs. Host machine 800 is running virtual machines 802, 804, 806, and 808. An arrow 940 indicates data flow between accelerator card 760 and external I/O devices (e.g., network, storage, and wireless devices).

A programmer may incorporate industry standard source code references to input/output (I/O), especially high-speed, low-latency I/O, into separated source code portions that are marked or annotated. In this way, the programmer may create functionally related source code portions with external data I/O in direct physical proximity to functionally related run-time CPU cores 812 and memory 814. This may have an advantage of greater performance while avoiding latencies and slow-downs caused by the virtualized environment of host machine 800, I/O indirectly routed via the motherboard, and a heterogeneous plurality of CPUs running functionally unrelated software. Other inefficiencies may be avoided (e.g., overhead).

In an example, the programmer may incorporate industry standard source code references to streaming, Remote Process Calls (RPC), Open Message Passing Interface (Open MPI), and other forms of inter-computer communication into source code portions marked (or annotated). In this way, the program may create functionally related source code portion with inter-computer communication in direct physical proximity to functionally related run-time CPU cores 812 and memory 814. This may have an advantage resulting in greater multi-computer performance while avoiding latencies and slow-downs caused by the virtualized environment of host machine 800, I/O indirectly routed via the motherboard, and a heterogeneous plurality of CPUs running functionally unrelated software. Other inefficiencies may be avoided (e.g., overhead and high latency).

It may be desirable for a computing device to operate as virtualized machine in order to achieve the highest possible performance, lowest possible power consumption (which may include both lowest cost of energy and lowest cost of cooling), and highest possible I/O rates between external sources and the data centers, which are often remotely located for cooling, cost, and security reasons.

As discussed above and further emphasized here, the figures are merely examples, which should not unduly limit the scope of the claims. For example, it should be understood that although one source code separator and source code stream pre-processor are illustrated, other embodiments including more than one source code separator and/or more than one source code stream pre-processor are within the scope of the present disclosure.

III. Example Method

Figure 10:
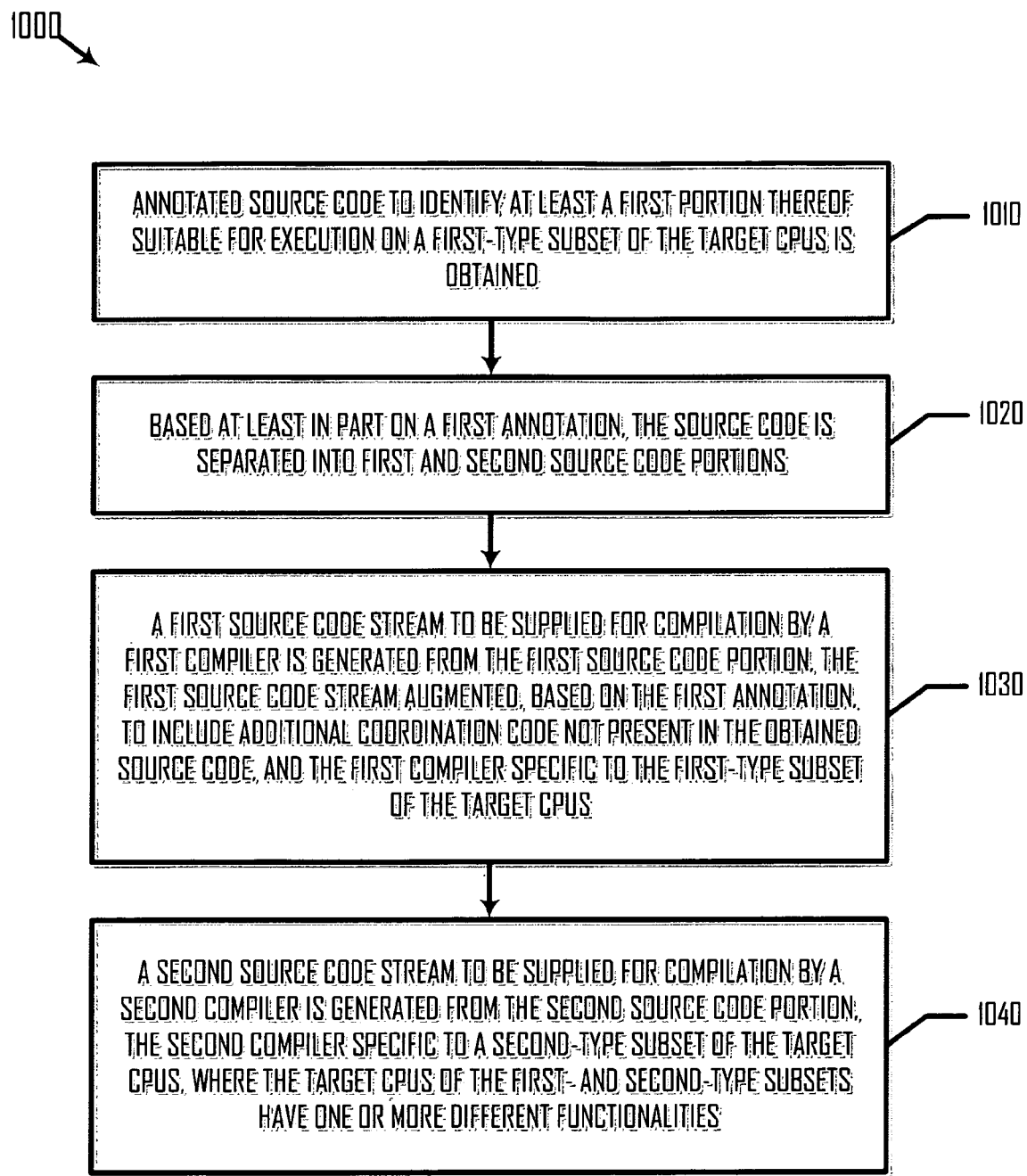
FIG. 10 is a flowchart illustrating a method of preparing source code for compilation for, and eventual coordinated execution on, a heterogeneous plurality of target CPUs, according to an embodiment.

FIG. 10 is a flowchart 1000 illustrating a method of preparing source code for compilation for, and eventual coordinated execution on, a heterogeneous plurality of target CPUs, according to an embodiment. Method 1000 is not meant to be limiting and may be used in other applications.

Method 1000 includes blocks 1010-1040. In a block 1010, annotated source code to identify at least a first portion thereof suitable for execution on a first-type subset of the target CPUs is obtained. In an example, I/O interface 110 obtains source code annotated to identify at least a first portion thereof suitable for execution on first-type subset of the target CPUs 220. In a block 1020, based at least in part on a first annotation, the source code is separated into first and second source code portions. In an example, based at least in part on a first annotation, source code separator 108 separates the source code into first and second source code portions.

In a block 1030, a first source code stream to be supplied for compilation by a first compiler is generated from the first source code portion, the first source code stream augmented, based on the first annotation, to include additional coordination code not present in the obtained source code, and the first compiler specific to the first-type subset of the target CPUs. The coordination code can include, for example, run-time data transfer, initialization and code download per CPU type, synchronization, resource management, core allocation, and various types of monitoring, including core usage, memory usage, and thermal tracking. In an example, source code stream pre-processor 112 generates from first source code portion 112 a first source code stream to be supplied for compilation by a first compiler 130, the first source code stream augmented, based on the first annotation, to include additional coordination code not present in the obtained source code, and first compiler 130 specific to first-type subset of target CPUs 220.

In an block 1040, a second source code stream to be supplied for compilation by a second compiler is generated from the second source code portion, the second compiler specific to a second-type subset of the target CPUs, where the target CPUs of the first- and second-type subsets have one or more different functionalities. The first- and second-type subsets may be substantially different from one another based on, for example, disparate performance and power consumption characteristics, volume (e.g., package size), weight, and internal design and architecture, such as a dissimilar instruction set architecture. In an example, source code stream pre-processor 112 generates from second source code portion 114 a second source code stream. 122 to be supplied for compilation by a second compiler 132, second compiler 132 specific to second-type subset of the target CPUs 222, where target CPUs of the first- and second-type subsets have one or more different functionalities.

It is also understood that additional processes may be performed before, during, or after blocks 1010-1040 discussed above. It is also understood that one or more blocks of method 1000 described herein may be omitted, combined, or performed in a different sequence as desired.

IV. Example Computing System

Figure 11:
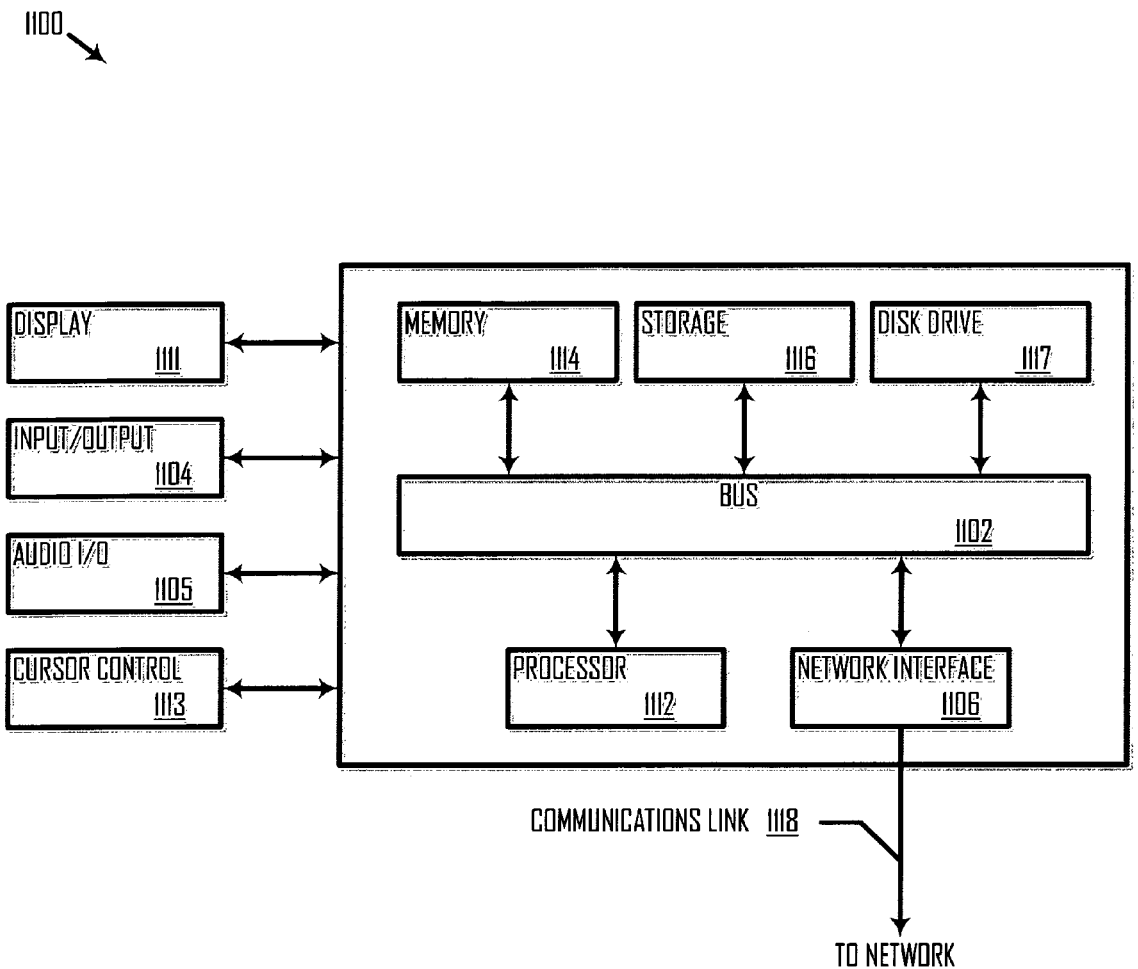
FIG. 11 is a block diagram of an electronic system suitable for implementing one or more embodiments of the present disclosure.

FIG. 11 is a block diagram of a computer system 1100 suitable for implementing one or more embodiments of the present disclosure. Editor 102, source code separator 108, and source code stream pre-processor 112 may be incorporated into a computing device that includes one or more CPUs. The one or more CPUs may be incorporated into an accelerator card (or board, typically inserted into a PCIe slot in the computer system). The computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 1100 includes a bus 1102 or other communication mechanism for communicating information data, signals, and information between various components of computer system 1100. Components include an input/output (I/O) component 1104 that processes a user action, such as selecting keys from a keypad/keyboard, selecting one or more buttons or links, etc., and sends a corresponding signal to bus 1102. I/O component 1104 may also include an output component such as a display 1111, and an input control such as a cursor control 1113 (such as a keyboard, keypad, mouse, etc.). An optional audio I/O component 1105 may also be included to allow a user to use voice for inputting information by converting audio signals into information signals. Audio I/O component 1105 may allow the user to hear audio. A transceiver or network interface 1106 transmits and receives signals between computer system 1100 and other devices via a communications link 1118 to a network. In an embodiment, the transmission is wireless, although other transmission mediums and methods may also be suitable. A processor 1112, which may be a micro-controller, digital signal processor (DSP), or other processing component, processes these various signals, such as for display on computer system 1100 or transmission to other devices via communications link 1118. Processor 1112 may also control transmission of information, such as cookies or IP addresses, to other devices.

Components of computer system 1100 also include a system memory component 1114 (e.g., RAM), a static storage component 1116 (e.g., ROM), and/or a disk drive 1117. Computer system 1100 performs specific operations by processor 1112 and other components by executing one or more sequences of instructions contained in system memory component 1114. Logic may be encoded in a computer readable medium, which may refer to any medium that participates in providing instructions to processor 1112 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 1114, and transmission media includes coaxial cables, copper wire, and fiber optics, including wires that include bus 1102. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 1100. In various other embodiments of the present disclosure, a plurality of computer systems 1100 coupled by communications link 1118 to the network (e.g., such as a LAN, WLAN, PTSN, and/or various other wired or wireless networks, including telecommunications, mobile, and cellular phone networks) may perform instruction sequences to practice the present disclosure in communication and cooperation with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of preparing source code for compilation for, and eventual coordinated execution on, a heterogeneous plurality of target CPUs, the method comprising:
    obtaining source code annotated to identify at least a first portion thereof suitable for execution on a first-type subset of the target CPUs;
    based at least in part on a first annotation, separating the source code into first and second source code portions;
    generating from the first source code portion a first source code stream to be supplied for compilation by a first compiler, the first source code stream augmented, based on the first annotation, to include additional coordination source code not present in the obtained source code, and the first compiler specific to the first-type subset of the target CPUs; and
    generating from the second source code portion a second source code stream to be supplied for compilation by a second compiler, the second compiler specific to a second-type subset of the target CPUs,
    wherein the target CPUs of the first- and second-type subsets have one or more different functionalities.

2. A method as in claim 1,
    wherein the first annotation notates a number or scale parameter for the first-type subset of the target CPUs for which the augmented first source code stream is to be compiled.

3. A method as in claim 1, further including:
    supplying the augmented first source code stream to the first compiler for compilation; and
    supplying the second source code stream to the second compiler for compilation.

4. A method as in claim 1, further including:
    obtaining a first binary executable program created by the first compiler, wherein the first compiler compiled the augmented first source code stream into the first binary executable program; and
    obtaining a second binary executable program created by the second compiler, wherein the second compiler compiled the second source code stream into the second binary executable program.

5. A method as in claim 4, further including:
    supplying the first binary executable program for execution on the first-type subset of the target CPUs; and
    supplying the second binary executable program for execution on the second-type subset of the target CPUs.

6. A method as in claim 5,
    wherein the first source code stream is augmented, based on the first annotation, to include a reference to the second binary executable program.

7. A method as in claim 1,
    wherein the second source code stream is augmented, based on the first annotation, to include additional coordination code not present in the obtained source code.

8. A method as in claim 1, further including:
    based at least in part on a second annotation, separating the source code into a third source code portion;
    generating from the third source code portion a third source code stream to be supplied for compilation by the first compiler, the third source code stream augmented, based on the second annotation, to include additional coordination code not present in the obtained source code; and
    supplying the augmented third source code stream to the first compiler for compilation.

9. A system for preparing source code for compilation for, and eventual coordinated execution on, a heterogeneous plurality of target CPUs, the system comprising,
    an input/output interface that facilitates the retrieval of annotated source code, wherein the annotated source code identifies at least a first portion thereof suitable for execution on a first-type subset of the target CPUs;
    a source code separator that, based at least in part on a first annotation, separates the source code into first and second source code portions; and
    a source code stream pre-processor that generates from the first source code portion a first source code stream to be supplied for compilation by a first compiler and generates from the second source code portion a second source code stream to be supplied for compilation by a second compiler, wherein the source code stream pre-processor augments, based on the first annotation, the first source code stream to include additional coordination source code not present in the obtained source code, wherein the first compiler is specific to the first-type subset of the target CPUs, wherein the second compiler is specific to a second-type subset of the target CPUs, and wherein the target CPUs of the first- and second-type subsets have one or more different functionalities.

10. A system as in claim 9, wherein the target CPUs of the first- and second type subsets are of respectively different CPU types selected from the set of:
one or more general purpose CPU cores;
one or more high performance multicore CPUs; and
one or more low-power CPUs.

11. A system as in claim 9,
wherein the compiler compiles the augmented first source code stream to create a first binary executable program for execution on the first-type subset of the target CPUs.

12. A system as in claim 11,
wherein the first-type subset of the target CPUs executes the first binary executable program.

13. A system as in claim 9,
wherein the target CPUs of the first- and second-type subsets reside in a common computing system.

14. A system as in claim 9,
wherein the target CPUs of the first- and second-type subsets reside in distributed computing systems.

15. A system as in claim 14,
wherein at least some of the first-type subset of the target CPUs reside in different computing systems.

16. A system as in claim 15,
wherein at least one target CPU of the first-type subset includes run-time data I/O resources allowing bypass of a virtualization layer, wherein the first source code portion includes input, processing, and output that is targeted to one or more run-time data I/O resources, and the coordination code includes code to support run-time data I/O.

17. A system as in claim 9,
wherein the source code pre-processor, based at least in part on a second annotation, separates the source code into a third source code portion, and
wherein the source code stream pre-processor generates from the third source code portion a third source code stream to be supplied for compilation by the first compiler and augments, based on the second annotation, the third source code stream to include additional coordination code not present in the obtained source code, wherein the source code stream pre-processor supplies the augmented third source code stream to the first compiler for compilation.

18. A system as in claim 9, further including:
an editor that annotates the source code.

19. A system as in claim 9, wherein the compiler compiles the augmented first source code stream to create a plurality of first binary executable programs for execution on the first-type subset of the target CPUs, and the first-type subset of the target CPUs includes a multi core CPU, and each core executes a different binary executable program of the plurality of first binary executable programs.

20. The system of claim 9, wherein the target CPUs of the first- and second-type subsets are of a dissimilar performance and power consumption characteristics, volumes (e.g., package sizes), weights, or internal design and architectures.

21. A non-transitory machine-readable medium comprising a plurality of machine-readable instructions that when executed by one or more processors is adapted to cause the one or more processors to perform a method comprising:
obtaining source code annotated to identify at least a first portion thereof suitable for execution on a first-type subset of the target CPUs;
based at least in part on a first annotation, separating the source code into first and second source code portions;
generating from the first source code portion a first source code stream to be supplied for compilation by a first compiler, the first source code stream augmented, based on the first annotation, to include additional coordination source code not present in the obtained source code, and the first compiler specific to the first-type subset of the target CPUs; and
generating from the second source code portion a second source code stream to be supplied for compilation by a second compiler, the second compiler specific to a second-type subset of the target CPUs,
wherein the target CPUs of the first- and second-type subsets have one or more different functionalities.

22. The method of claim 1,
wherein the additional coordination source code is in a high-level programming language and has not yet been compiled, and
wherein the additional coordination code includes at least one of run-time data transfer, initialization and code download specific to the first-type subset of the target CPUs, synchronization, resource management, core allocation, shared library, or an application programming interface (API) call to move run-time data, control, and status operands between the first- and second-type subsets of the target CPUs.

23. The method of claim 1,
wherein the first source code stream is separated from the obtained source code, and wherein the separated first source code stream is augmented, based on the first annotation, to include additional source code not present in the obtained source code.

24. The method of claim 1,
wherein the first source code stream is further augmented based on the originally obtained source code.

* * * * *